Dec. 9, 1969       P. J. ERNISSE       3,482,497
AUTOMATIC EXPOSURE CONTROL FOR CAMERAS
Filed March 15, 1967                  3 Sheets-Sheet 1

PAUL J. ERNISSE
INVENTOR.

BY *Daniel E. Sragow*
*Robert W. Hampton*

ATTORNEYS

Dec. 9, 1969  P. J. ERNISSE  3,482,497
AUTOMATIC EXPOSURE CONTROL FOR CAMERAS
Filed March 15, 1967  3 Sheets-Sheet 2

PAUL J. ERNISSE
INVENTOR.

BY *Daniel E. Dragon*
*Robert W. Hampton*
ATTORNEYS

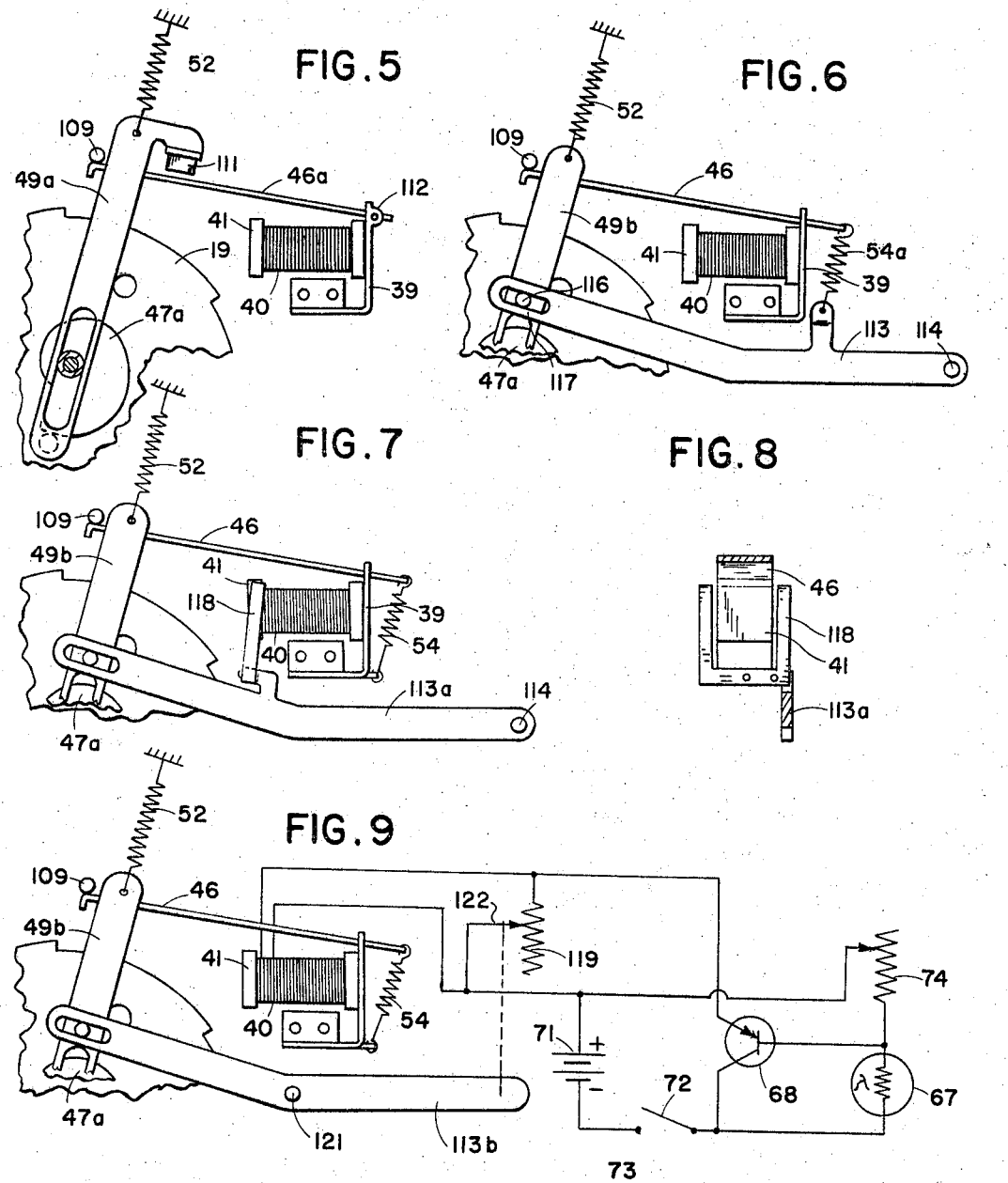

United States Patent Office 3,482,497
Patented Dec. 9, 1969

3,482,497
AUTOMATIC EXPOSURE CONTROL
FOR CAMERAS
Paul Justen Ernisse, Rochester, N.Y., assignor to Eastman
Kodak Company, Rochester, N.Y., a corporation of
New Jersey
Filed Mar. 15, 1967, Ser. No. 623,435
Int. Cl. G01j 1/00, 1/52; G03b 9/00
U.S. Cl. 95—10                                            18 Claims

ABSTRACT OF THE DISCLOSURE

An automatic diaphragm control in which a diaphragm with apertures of various sizes is rotated and then stopped by a member controlled by an electromagnet. The effective force of the electromagnet is gradually increased as the diaphragm rotates so that the diaphragm is stopped at a point determined by the current passing through the electromagnet, which is in turn determined by a photocell.

---

The present invention relates to photographic cameras and more particularly to such cameras including means for regulating automatically the exposure of the film therein in response to changes in scene brightness.

Automatic exposure control devices in photographic cameras generally include a photocell and an electromechanical transducer means responsive thereto for adjusting either the diaphragm aperture, the shutter speed, or both, as a function of the intensity of scene illumination, as detected by the photocell. In such systems, it is also known to employ, as the electromechanical relay device, an electromagnet energized by or under the control of the photocell. The two types of photocells generally used for such applications are photovoltaic cells, e.g., selenium cells, which produce a small voltage output proportional to illumination of the cell, and photoconductive cells, e.g., cadmium sulfide (CdS) cells, the electrical resistance of which changes as a function of cell illuminance. In these systems, employing an electromagnetic relay an armature of relatively high magnetic permeability and relatively low residual magnetism is located adjacent the electromagnet and is movable between a first position in spaced relation to the electromagnet and a second position nearer thereto. A predetermined resilient force is applied to the armature tending to maintain it in its first position, whereby it will assume its second position only when the field intensity of the electromagnet, functionally related to scene brightness, reaches a threshold value sufficient to overcome such resilient force.

Since such an electromagnetic device requires substantially more current for its operation than does a galvanometer of the type often used in other types of automatic exposure control systems, the output of a photovoltaic cell is not sufficient, for practical purposes, to actuate the electromagnet directly. Therefore, a supplemental power source is required, which may be associated with an electrical amplifier. Regardless of whether an amplifier is used, however, the availability of a supplemental current source favors the use of a photoconductive cell, such cells generally being of greater sensitivity and longevity than photovoltaic cells.

In the simplest form of automatic exposure control systems utilizing such a device, a diaphragm vane is carried by the armature and is moved into alignment with the lens when the armature assumes its second position, whereby the lens has a first predetermined effective aperture when scene illumination is below the threshold level and a smaller predetermined aperture when the illumination is above that level. To provide a greater number of aperture variations, additional vane supporting armatures may be included, which are movable respectively at different threshold levels to sequentially position successively restrictive vanes in alignment with the lens. However, for practical purposes, only a very limited number of different diaphragm openings can be provided with such a system. To overcome this limitation, therefore, another system utilizing such an electromagnetic relay employs a pair of coupled variable diaphragms, one in front of the photocell and the other in alignment with the lens. Both diaphragms are initially closed and are opened gradually and simultaneously in response to manual depression of a camera operating member. When the photocell diaphragm opens sufficiently so that the magnetic field of the electromagnet reaches the threshold level at which the armature is moved thereby, such movement of the armature blocks further opening of the diaphragms, whereby the lens diaphragm is set to an opening corresponding to scene brightness. However, in addition to the rather complicated mechanism involved, such a construction has another disadvantage in that the illumination area of the photocell rapidly increases as the camera operating member is depressed. This rapid variation in illuminated area of the photocell is detrimental to the use of the otherwise preferable photoconductive type of cell, due to the fact that such cells generally are not instantaneous in their response to illumination. Therefore, to insure accurate light measurements, such cells should be exposed to the illumination being measured for a finite time interval, sometimes referred to as the "wake up" time of the cell, before the conductivity of the cell is sensed to determine the illumination intensity.

In view of the foregoing, a primary object of the present invention is to simplify the construction of an electromagnetic type of automatic exposure control device adapted to provide several different diaphragm apertures corresponding to different levels of scene illumination, without altering the illuminated area of the photocell during the aperture adjusting operation of the automatic exposure control device. In one embodiment of the invention, this object is realized by energizing the electromagnet in proportion to the electrical response of a photocell illuminated over a predetermined fixed area thereof, and by operatively coupling the armature to a movable diaphragm adjusting member. As the camera operating lever is depressed, the diaphragm adjusting member moves in response thereto to increase the diaphragm aperture, while simultaneously increasing the sensitivity of the armature to the magnetic field of the electromagnet until the armature is attracted by the electromagnet into its second position, in which it blocks further movement of the diaphragm adjusting member. Such gradual increase in the sensitivity of the armature may be accomplished by reducing the air gap between the electromagnet and the armature, as in one embodiment of the invention, alternate embodiments also being illustrated in which this same function is accomplished by varying the resilient force biasing the armature toward its first position.

Still another embodiment of the invention adapted to realize the same primary object involves modulating the output of the photocell by gradually decreasing a resistance to such output or increasing its amplification, in response to movement of the diaphragm member, to increase gradually the magnetic force exerted on the armature until such force is sufficient to move the armature to its second position, in which it blocks further movement of the diaphragm member.

Another object of the invention is to provide such an automatic exposure control system with means for establishing a predetermined number of possible diaphragm apertures adapted to restrict the lens opening in symmetrical relation to the lens axis.

Still another object of the invention is to prolong the longevity of the supplemental power source employed in conjunction with the automatic exposure control device by means of a switch adapted to isolate the power source except during operation of the camera operating member.

Yet another object of the invention is to incorporate in such an automatic exposure control device means for varying automatically the speed of the camera shutter in predetermined relation to movement of the diaphragm member, a related object being to provide for selective modification of the predetermined relation between the shutter speed and aperture adjustments.

A further object is to simplify the construction of such a device while at the same time increasing its ruggedness and reliability.

These and other important objects of the invention will be apparent from the following description, reference being made to the accompanying drawings in which like numerals refer to like elements and in which:

FIG. 5 is a partial front elevational view of a construction corresponding generally to FIG. 1 but employing a permanent magnet movable in response to movement of the movable diaphragm member to provide the variable resilient force by which the armature is biased away from the electromagnet;

FIG. 6 is a partial front elevational view corresponding to FIG. 5 showing another means for varying the resilient force biasing the armature away from the electromagnet, by altering the tension of a spring member;

FIG. 7 is a partial front elevational view corresponding to FIGS. 5 and 6 showing yet another means for altering the sensitivity of the armature to movement by the electromagnet when the latter is energized by a predetermined current flow, such means comprising a magnetically permeable body adjacent the electromagnet and movable in response to movement of the diaphragm member;

FIG. 8 is a side elevational view of the permeable body and the electromagnet illustrated in FIG. 7; and FIG. 9 is a front elevational view corresponding generally to FIGS. 5, 6, and 7, showing still another embodiment of the invention incorporating an arrangement for modifying the energization of the electromagnet, as a function of scene illumination, to vary its attractive influence on the armature in opposition to a preestablished opposing resilient force.

Figure 1:
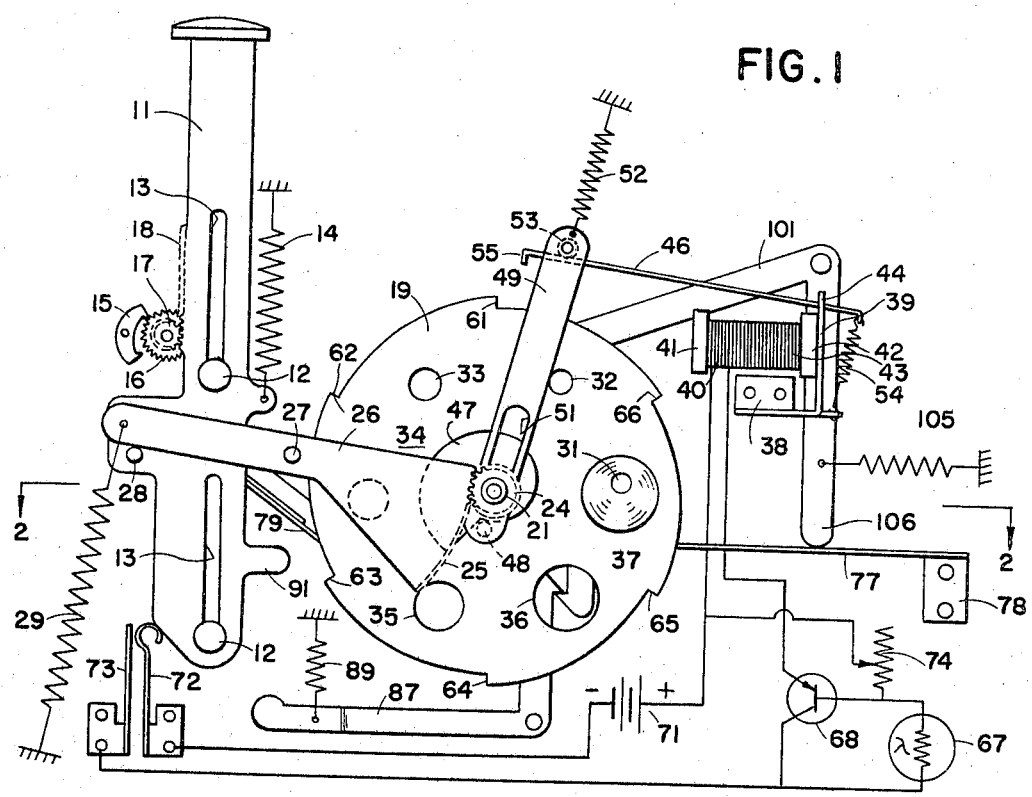
FIG. 1 is a front elevational view of the essential elements comprising an automatic exposure control system according to one embodiment of the invention, in which the armature is moved toward the electromagnet in response to movement of the diaphragm member to locate successively larger apertures in alignment with the camera lens.
Figure 2:
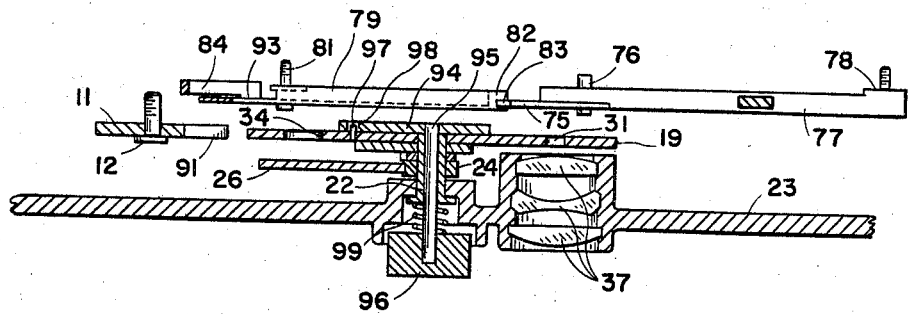
FIG. 2 is a cross-sectional top plan view taken along line 2—2 of FIG. 1 and including a portion of the front wall of the camera and the shutter speed adjusting knob.
Figure 3:
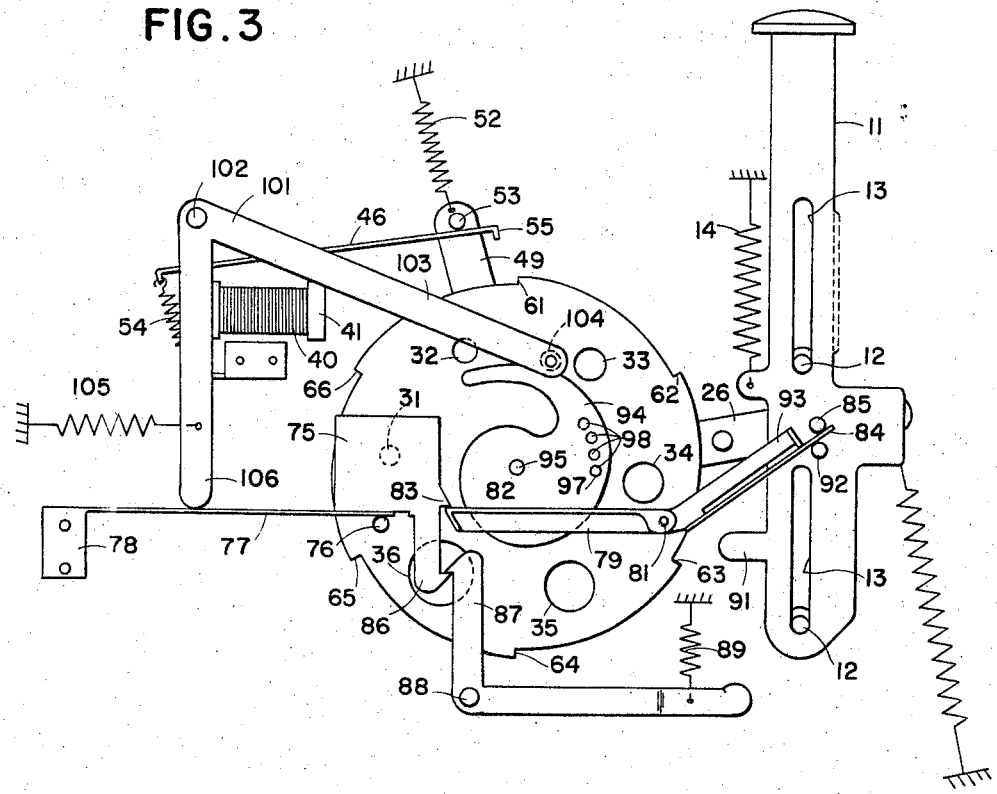
FIG. 3 is a rear elevational view of the construction shown in FIGS. 1 and 2 illustrating the mechanism employed to change the shutter speed in response to changes in the lens aperture.
Figure 4:
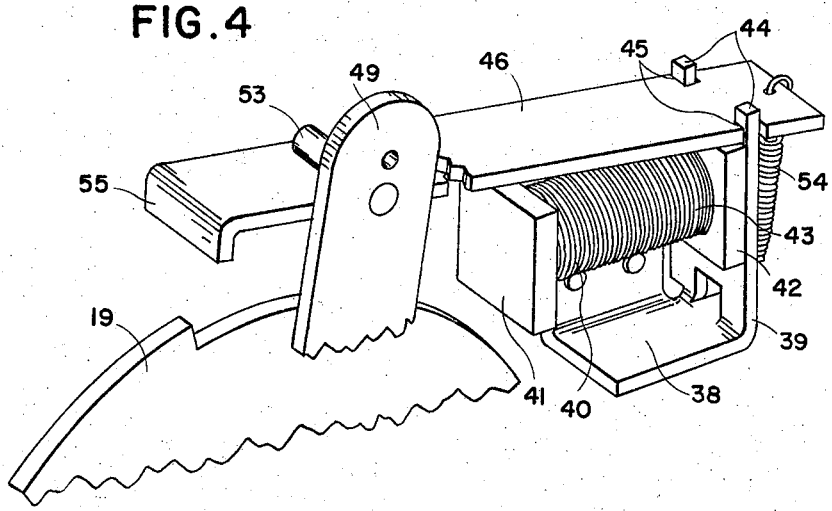
FIG. 4 is a partial perspective view of the electromagnet and armature assembly illustrated in FIGS. 1 and 3.

In the mechanism shown in FIGS. 1, 2 and 3, the camera operating member 11 is supported by studs 12 extending through slots 13 for downward movement against the influence of spring 14. As the operating member is depressed, such movement is controlled by an escapement comprising pivotally mounted anchor member 15 cooperating with a rotatable escape wheel 16 attached to pinion 17 in engagement with rack 18, whereby the movement of the operating member cannot exceed a predetermined speed.

The diaphragm member comprises a disk 19, of the type commonly referred to as a "Waterhouse disk," rotatably supported by a tubular hub member 21 extending through support hole 22 in the front wall 23 of the camera housing. Hub member 21 also has attached thereto a gear 24 which is engaged by gear segment 25 of intermediate lever 26 pivotally supported by pin 27. The end of the intermediate lever opposite the gear segment is adjacent the camera operating member and is biased downwardly into contact with a pin 28 thereon by spring 29, which is of insufficient strength to move the operating member against the influence of spring 14. When the operating member is depressed, intermediate lever 26 is maintained in contact with pin 28 by spring 29, whereby gear segment 25 rotates disk 19 to move each of the successively larger apertures 31 through 36, in turn, into alignment with the camera lens 37.

A stationary support member 38 includes a vertical plate 39 by which is supported an electromagnet 40 comprising pole pieces 41 and 42 at opposite ends of the magnet coil 43. Above pole piece 42, the vertical plate is notched to define upstanding ears 44, most clearly shown in FIG. 8, which are received in corresponding opposed notches 45 in armature 46, which is thereby supported above the electromagnet for rocking movement relative thereto.

A cam member 47 is located centrally of disk 19 adjacent the front surface thereof in fixed relation thereto and is engaged by a rearwardly extending cam follower pin 48 on slide member 49, which is supported between cam 47 and gear 24 by tubular member 21 extending through slot 51 in the slide member. At its upper end, the slide member is attached to spring 52 which urges it in an upward direction, maintaining cam follower pin 48 in contact with the cam, whereby clockwise rotation of disk 19 in response to depression of the camera operating member is accompanied by downward movement of the slide member under the influence of the cam. Near the top end of the slide member, a forwardly extending pin 53 thereon is engaged by the upper surface of the adjacent end of armature 46, which is resiliently biased into contact with the pin by a light spring member 54 urging the other end of the armature in a downward direction. Accordingly, when the electromagnet is energized, an attractive magnetic force will be exerted on the armature tending to move it out of contact with pin 53 into engagement with pole piece 41. However, as will be described below, the current flow to the electromagnet, and hence the intensity of its magnetic field are proportional to the intensity of scene illumination and, therefore, unless the scene is very brightly illuminated, the electromagnet cannot exert enough attractive force on the armature across the intervening air gap to overcome the resilient force of spring 54. As the disk is rotated by depression of member 11, however, pin 53 moves the armature gradually closer to the electromagnet, thereby decreasing the air gap between the two elements, until the gap has closed to the point where the magnetic force overcomes the resistance of spring 53 and attracts the armature toward pole piece 41. Such movement of the armature disengages the end thereof adjacent slide 49 from contact with pin 53 and moves the depending ear 55 on the armature against the periphery of disk 19. About its periphery, disk 19 is provided with a plurality of shoulders 61 through 66, each of which bears the same arcuate relation to a corresponding one of the apertures 31 through 36, as each of the other shoulders bears to its corresponding aperture. Therefore, when ear 55 engages the periphery of the disk, its rotation will be blocked as soon as the adjacent shoulder abuts against the ear, whereby the corresponding aperture is aligned with the lens. For example, assuming that the electomagnet is energized to a level corresponding to scene illumination of an intensity which would require an aperture of f/11 for proper exposure of a particular type of film at a predetrmined shutter speed, and that aperture 33 is of such size, ear 55 will move into contact with the periphery of disk 19 during its rotation when the peripheral surface between shoulders 62 and 63 is adjacent the ear. After the ear has contacted this surface, the disk will continue to rotate until shoulder 63 is engaged thereby, at which time aperture 33 is aligned with lens 37. As the operator continues to depress the operating member, pin 28 moves out of contact with intermediate lever 26, allowing the disk to remain in its previously established rotational position.

The electrical system employed to energize the electromagnet in proportion to scene illumination comprises a cadmium sulfide photocell 67 (CdS), which has the property of having a relatively high resistance in darkness, which is reduced in proportion to illumination of the cell. The cell is connected between the base and the collector of a P-N-P type transistor 68. The emitter of the transistor is connected through magnet coil 43 to the positive terminal of battery 71, the negative terminal of which is connected to the collector through a switch comprising contact members 72 and 73, which are closed by the initial downward movement of member 11 and remain closed until that member is returned to its raised position. A variable resistor 74 is also incorporated in the circuit between the base of the transistor and the positive side of the battery. By this arrangement, when the cell is in darkness its resistance is relatively high and therefore the base return negative voltage of the transistor is correspondingly low. However, as the resistance of the cell decreases in response to its exposure to light, the base return negative voltage is correspondingly increased, whereby a proportional but much greater current flows through the transistor to the relay coil. By varying the resistance of variable resistor 74, the effect of the photocell on the base return negative voltage can be modulated for purposes of calibrating the system initially, or, perhaps, for purposes of adjusting the response of the system in accordance with different film speeds. It should be understood, of course, that the particular circuit described is merely illustrative inasmuch as various other amplifier circuits could be employed for the same purpose. In this same regard, by utilizing a more sensitive relay, the amplifying circuit might be eliminated entirely by wiring the relay coil directly in series with the battery and the cell, and perhaps with a calibrating variable resistor. However, for practical purposes, the difficulties and expense involved in providing a reliable and rugged relay of such greater sensitivity favor the inclusion of the additional components required to amplify the photocell response.

From the foregoing description, then, it is apparent that depression of member 11 energizes the light responsive electrical system and rotates disk 19 to a position in which an aperture corresponding to scene illumination is aligned with the camera lens, thus providing completely automatic control of the lense diaphragm.

The shutter mechanism employed in the illustrated construction is best shown in FIG. 3, and comprises a shutter blade 75 located in alignment with the lens adjacent stop pin 76 by a resilient arm 77, supported at its opposite end by stationary support ear 78. A spring lever 79, pivotally supported at 81, includes a chamfered end 82 latched beneath a pawl 83 on the shutter blade. At its opposite end, the spring lever includes a resilient blade 84 adapted to be flexed downwardly by pin 85 on the shutter operating member as the latter is depressed, thereby exerting a resilient upward force on the shutter blade. To retain the shutter blade in its closed position against the influence of the spring lever 79 during the initial depression of member 11, a depending latching ear 86 on the shutter blade is engaged by a pawl member 87 pivotally supported at 88 and maintained in releasable engagement with the latching ear by spring 89. As the operating member is depressed, therefore, an increasing upward resilient force is applied to the shutter blade by the spring lever. When such movement operating lever has proceeded to an extent sufficient to complete the previously described aperture adjusting operation, shutter release arm 91 engages the adjacent end of the pawl member and moves the pawl thereof out of engagement with latching ear 86, whereupon the chamfered end of the spring lever pivots upwardly with considerable force, raising the shutter blade out of alignment with the lens against the resilient influence of arm 77. As the spring lever assumes a position in which the resilient blade thereof is no longer under stress, the chamfered end of the arm moves out of engagement with pawl 83, whereby the shutter is returned to its closed position by resilient arm 77 when its upward inertia has been overcome by the resiliency of that arm. With the exposure thus having been completed, the operating member is released and is returned to its initial position by spring 14. During such return movement of member 11, a pin 92 thereon engages the lower surface of blade 84, which is prevented from flexing in an upward direction relative to the spring lever by arm 93 thereof. Accordingly, the spring lever is moved back to its illustrated position, during which movement the chamfered end of the lever engages the sloped top surface of pawl 83 and displaces the shutter blade laterally by flexing arm 77, to re-establish the chamfered end of the arm in its former position below the pawl.

In order to adjust the shutter speed, as well as the lens opening, as a function of light intensity, a second cam member 94 is located rearwardly adjacent disk 19 and is supported by a shaft 95 extending through tubular hub member 21 and attached to a shutter adjusting knob 96 located forwardly of wall 23. A detent pin 97, projecting rearwardly from disk 19 is received with one of a plurality of arcuately spaced holes 98 in cam member 94, which is urged into contact with the disk by a spring 99 between the front wall of the camera and knob 96, thereby preventing rotational movement of the cam relative to the disk. Bellcrank arm 101, pivotally supported by stud 102 is provided on its generally horizontal arm 103 with a cam follower pin 104 maintained in contact with cam 94 by spring 105 attached to other bellcrank arm 106, the end of which is immediately adjacent the top surface of resilient arm 77 supporting the shutter blade. Therefore, as disk 19 is rotated as previously described, to present progressively larger apertures to the lens, cam follower pin 104 moves toward the center of the disk, thereby moving the end of the bellcrank arm 106 along the resilient arm 77 toward its stationary end. Since the speed with which the shutter returns to its closed position in opposition to the upward inertia imparted to it by spring lever 79 is a function of the downward resilient force of arm 77, such movement of the bellcrank decreases the shutter speed by increasing the effective length of the resilient arm. This concept of simultaneously increasing or decreasing both the exposure time and the lens opening is described in U.S. Patent No. 2,999,439, issued to Nerwin et al. on Sept. 12, 1961, but is used merely to illustrate the means by which the two factors may be coordinated, since any other desired speed and aperture relation can be effected by providing a suitable profile on cam 94. Additionally , in the illustrated embodiment, cam 94 can be oriented radially to any of four different positions relative to disk 19 by depressing knob 96 and rotating the cam thereby to a position in which a selected one of holes 98 receives detent pin 97, whereby, for example, the system might be adjusted to accommodate film of various speed ratings.

While the foregoing description illustrates a mechanism in which the exposure control armature is moved toward the electromagnet until it reaches a threshold position in which the magnetic field overcomes the opposite resilient force exerted on the armature, a similar mode of operation, employing basically the same structural arrangement, can also be achieved by varying the resilient force opposing the magnetic attraction of the armature, in response to movement of the aperture disk. In the drawings illustrating different embodiments of such structures, components corresponding to those previously described are identified by the same numeral, followed by a letter suffix indicating different modifications of such components. In the construction illustrated in FIG. 5, pin 53 and spring 54 are omitted and replaced by a stationary pin 109, a permanent magnet 111 supported above the armature on slide member 49(a), and a pivotal support member 112 for armature 46(a). Also, in this embodiment, and those shown in FIGS. 6 through 10, the profile of cam 47(a) is reversed to raise member 49 in response to clockwise rotation of disk 19. Thus, the resilient force applied to the armature in opposition to its attraction to the electromagnet is supplied by the permanent magnet, which magnetically maintains the adjacent end of the armature in contact with pin 111 prior to rotation of the aperture disk. As the disk is rotated, however, slide member 49(a) moves upwardly, increasing the gap between magnet 112 and armature 46(a), thereby decreasing the force exerted on the armature by the magnet until such force is overcome by the magnetic field of the electromagnet, related in intensity to scene illumination, whereupon the armature moves into blocking engagement with the disk.

Another generally similar arrangement is shown in FIG. 6, in which the resilient upward force urging the armature toward pin 109 is supplied by spring 54(a), which is attached at its lower end to lever 113 pivoted on stationary pivot 114 and operatively connected to slide member 49(b) by pin 116 extending through slot 117. By this arrangement, the upward movement of slide member 49(b) in response to rotation of the aperture disk results in decreasing the tension of spring 54(a) until such tension reaches a threshold value at which it is overcome by the attractive force of the electromagnet.

Still another similar embodiment is shown in FIG. 7, in which the armature is urged toward stationary pin 109 by spring 54, attached to the vertical support plate 39, as previously described. In this embodiment, therefore, the upward force on the armature is constant, as is the physical spacing of the raised armature relative to the electromagnet, but the effective gap is progressively reduced by a magnetically permeable yoke 118 straddling pole piece 41, as shown in FIG. 8, and movable upwardly on lever 113(a) in response to rotation of the disk, thereby progressively increasing the attractive effect of the electromagnet on the armature.

FIG. 9 shows yet another embodiment of the same general system in which the threshold effect of the relay is accomplished in a somewhat different manner. In this embodiment, the armature is urged upwardly against pin 109 by spring 54 in the same manner shown in FIG. 7. However, rather than increasing the upward tension on the armature or reducing the actual or effective air gap, this embodiment employs a second vraiable resistor 119 in the electrical circuit, the resistance of which is progressively increased in response to rotation of the disk by means of lever 113(b) pivoted at 121 adapted to move the sliding conduct member 122 of the variable resistor. By locating the variable resistor in shunt relation to magnet coil 43 in the same circuit previously described, such an increase in resistance, responsive to rotation of the disk, increases the current flowing to the coil and the strength of the resulting magnetic field. Accordingly, the magnetic force exerted on the armature is related both to light intensity, which determines the output of the transistor, and also to the position of the disk, which determines the value of the coil shunt. As the disk revolves to increase the lens aperture, therefore, the magnetic attraction of the electromagnet for the armature gradually increases until the tension of spring 54 is overcome, allowing the armature to move into blocking engagement with the disk. Variable resistor 74 still may serve for calibrating the system or for adjusting for various film speeds. It should be apparent that resistor 119 could be other than in shunt relation to the coil, or could be replaced by other means for similarly modulating the circuit to achieve the same result.

Since these and other modifications are possible without departing from the spirit of the invention, the foregoing description is to be considered as illustrative only and not as limiting the scope of the invention as defined by the appended claims.

I claim:

1. In a camera having an objective for forming an image of a scene in substantially an exposure plane, and having an exposure control system including: photoelectric means for producing an output varying in accordance with scence brightness, exposure control means for controlling the exposure of said plane to said scene, exposure adjusting means for adjusting said exposure control means from a first control condition toward a second control condition, and blocking means for stopping such exposure adjustment at an intermediate control condition related to scene brightness, the improvement wherein said blocking means comprises:

(a) a blocking member having a magnetically permeable portion, said member being movable between a first position in blocking relation to said exposure adjusting means and a second position,
   (b) resilient means for biasing said blocking member toward said second position,
   (c) electromagnet means positioned to exert a magnetic force on said blocking member for urging said blocking member toward said first position,
   (d) electrical mean for variably energizing said electromagnet means as a function of the output of said photocell, and
   (e) sensitivity control means for varying the distance from said blocking member to said first position as a function of the position of said exposure adjusting means.

2. In a camera the improvement defined by claim 1 in which said sensitivity control means comprises movable means engageable with said blocking member for moving said blocking member from said second position toward said first position in response to adjustment of said exposure control means by said exposure adjusting means from said first control position toward said second control condition.

3. In a camera the improvement defined by claim 1 in which said exposure adjusting means further comprises means for increasing the exposure of said exposure plane when said exposure control is adjusted from said first control condition toward said second control condition and for causing said movable member to move said blocking member from said second position toward said first position so that said electromagnet increases said force magnetically exerted on said blocking member.

4. In a camera the improvement defined by claim 1 in which said exposure control means comprises an adjustable shutter speed control member.

5. In a camera the improvement defined by claim 1 in which said exposure control means comprises a variable lens diaphragm mechanism.

6. In a camera the improvement defined by claim 1 in which:
  (a) said exposure control means comprises a rotatable apertured disk, said disk including a plurality of apertures of different sizes,
  (b) said exposure adjusting means comprising means for rotating said disk to align successive apertures thereof with said objective, and
  (c) means cooperating with said blocking member upon movement thereof to said first position for arresting rotation of said disk when one of said apertures is in aligned relation to said objective.

7. In a camera the improvement defined by claim 6 including:
  (a) a cam coupled to said disk for movement therewith,
  (b) a stop member disposed adjacent said blocking member and adapted to be engaged thereby under the influence of said resilient means, and
  (c) means operatively connecting said cam and said stop member for moving said stop member in response to movement of said cam to vary the spacing of said blocking member from said electromagnet means when said blocking member is in engagement with said stop member under the influence of said resilient means.

8. In a camera the improvement defined by claim 7 including:
  (a) a shutter,
  (b) a movable speed control member for regulating the speed of said shutter, and
  (c) means operatively associating said speed control member and said disk for varying the speed of said shutter in response to movement of said disk.

9. In a camera the improvement defined by claim 8 including:
  (a) a shutter plate,
  (b) an elongate blade resiliently urging said plate to a closed position in alignment with said objective,
  (c) impact means for moving said plate against the influence of said blade to an open position out of alignment with said objective,
  (d) an abutment member adjacent said blade, and
  (e) means movable by said control member for moving said abutment member along said blade in response to movement of said disk.

10. In a camera having a lens system for forming an image of a scene in substantially an exposure plane, and an exposure control system including: light sensing means including a photocell adapted for exposure to said scene, exposure control means optically aligned with said lens system for controlling the exposure of said plane, exposure adjusting means for adjusting said exposure control means to different control conditions corresponding respectively to the location of said exposure adjusting means during movement thereof from a first position to a second position, and blocking means for stopping movement of said exposure adjusting means at a location corresponding to scene brightness, the improvement comprising:
  (a) an electromagnet including a pole member,
  (b) a magnetically permeable member,
  (c) means for supporting one of said members for movement toward and away from the other of said members,
  (d) electrical means for energizing said electromagnet to a level related to scene brightness, so as to provide a magnetic force urging one member toward said other member,
  (e) means for applying to said one member a resilient force urging said one member away from said other member, in opposition to said magnetic force when said electromagnet is energized to said level,
  (f) means responsive to said exposure adjusting means for moving said one of said members in opposition to said resilient force, and
  (g) means for actuating said blocking means upon movement of said one member to a predetermined position relative to said exposure adjusting means.

11. In a camera the improvement defined by claim 10 in which said exposure adjusting means includes an abutment member movable therewith and defining a plurality of abutment surfaces, one of which is engageable by said blocking member upon actuation thereof to block further movement of said abutment member.

12. In a camera the improvement defined by claim 10 in which said one member comprises said magnetically permeable member.

13. In a camera having a lens system for focusing light from a scene onto an exposure plane and an exposure control system including: light sensing means including a photocell adapted for exposure to said scene, exposure control means optically aligned with said lens system for controlling the exposure of said plane, exposure adjusting means for adjusting said exposure control means to different control conditions corresponding respectively to the location of said exposure adjusting means during movement thereof from a first position to a second position, and blocking means for stopping movement of said exposure adjusting means at a location corresponding to scene brightness, the improvement comprising:
  (a) an electromagnet including a pole member,
  (b) a magnetically permeable member,
  (c) means supporting one of said members for movement toward and away from the other of said members,
  (d) electrical means for energizing said electromagnet to a predetermined level related to scene brightness, so as to produce a magnetic force urging said one member toward said other member,
  (e) means for applying to said one member a resilient force urging it away from said other member, in opposition to said magnetic force when said electromagnet is so energized to said predetermined level,
  (f) means responsive to said exposure adjusting means for varying said resilient force exerted on said one member, and
  (g) means for actuating said blocking means upon movement of said one member to a predetermined position relative to said exposure adjusting means.

14. In a camera the improvement defined by claim 13 further comprising movable support for said adjusting means, and in which said resilient means comprises a spring attached between said one member and said movable support.

15. In a camera the improvement defined by claim 13 in which the resilient means is a permanent magnet movable by said adjusting means.

16. In a camera the improvement defined by claim 13 further comprising means responsive to said exposure adjusting means for varying the permeability of the region including the magnetic domain established by said electromagnet adjacent said permeable member.

17. In a camera the improvement defined by claim 16 in which said means for varying the permeability of such region comprises a member of at least paramagnetic permeability movable by said adjusting means adjacent said pole member.

18. In an exposure control for a photographic camera having an exposure aperture through which illumination from a scene may be focused on an exposure plane, said exposure control comprising:
  (a) means for regulating the amount of illumination passed through said exposure aperture,
  (b) blocking means for setting the position of said regulating means, said blocking means comprising armature means operatively coupled thereto, (c) electromagnet means energizable as a function of scene illumination for actuating said armature means, and
(d) means for regulating the gap between said electromagnet means and said armature means as a function of the position of said regulating means, so as to regulate the force exerted on said armature means by said electromagnet means.

References Cited

UNITED STATES PATENTS

| | | |
|---|---|---|
| 3,000,281 | 9/1961 | Rentschler. |
| 3,027,818 | 4/1962 | Lee et al. |
| 3,205,795 | 9/1965 | Grey. |
| 3,246,585 | 4/1966 | Scudder. |
| 3,270,650 | 9/1966 | Ernisse _____ 95—64 |
| 3,385,187 | 5/1968 | Bestenreiner. |
| 3,393,619 | 7/1968 | Albedyll et al. |

NORTON ANSHER, Primary Examiner

JOSEPH F. PETERS, Jr., Assistant Examiner

U.S. Cl. X.R.

95—53, 64